US008462163B2

(12) United States Patent
Ito

(10) Patent No.: US 8,462,163 B2
(45) Date of Patent: Jun. 11, 2013

(54) COMPUTER SYSTEM AND MOTION CONTROL METHOD

(75) Inventor: Hirofumi Ito, Tokyo (JP)

(73) Assignee: CYBER CLONE Co., Ltd., Tokyo (JP)

( * ) Notice: Subject to any disclaimer, the term of this patent is extended or adjusted under 35 U.S.C. 154(b) by 978 days.

(21) Appl. No.: 12/310,436

(22) PCT Filed: Aug. 27, 2007

(86) PCT No.: PCT/JP2007/066574
§ 371 (c)(1),
(2), (4) Date: Jun. 29, 2009

(87) PCT Pub. No.: WO2008/023819
PCT Pub. Date: Feb. 28, 2008

(65) Prior Publication Data
US 2010/0013838 A1    Jan. 21, 2010

(30) Foreign Application Priority Data
Aug. 25, 2006    (JP) ................................. 2006-229188

(51) Int. Cl.
*G06T 13/00*    (2011.01)
(52) U.S. Cl.
USPC ........... 345/474; 345/419; 345/473; 345/475; 382/154
(58) Field of Classification Search
USPC .................... 345/419, 473, 474, 475; 382/154
See application file for complete search history.

(56) References Cited

U.S. PATENT DOCUMENTS

| 5,880,788 | A  | * | 3/1999 | Bregler | ......................... 348/515 |
| 6,072,496 | A  | * | 6/2000 | Guenter et al. | ............... 345/419 |
| 6,097,381 | A  | * | 8/2000 | Scott et al. | .................... 715/203 |
| 6,232,965 | B1 | * | 5/2001 | Scott et al. | .................... 715/203 |
| 6,600,491 | B1 | * | 7/2003 | Szeliski et al. | ................ 345/473 |

(Continued)

FOREIGN PATENT DOCUMENTS

| JP | 09-190549   | 7/1997  |
| JP | 2001-313883 | 11/2001 |
| JP | 2003-204537 | 7/2003  |
| JP | 2005-135046 | 5/2005  |

OTHER PUBLICATIONS

Kovar et al. "Motion Graphs", ACM 2002.*
Starck et al. "Video-Based Character Animation", ACM 2005.*
Saito et al. "Motion graphic ni yoru Jiritsugata Character no Dosa Animation Seisei Shuho" Information Society of Japan Kenkyu Hokoku, vol. 2001, No. 89, Sep. 14, 2001.

*Primary Examiner* — Kimbinh T Nguyen
(74) *Attorney, Agent, or Firm* — Muramatsu & Associates

(57) ABSTRACT

[PROBLEMS] To naturally and smoothly move a control target such as a virtual actor by using a small data amount and effectively perform data setting for it.
[MEANS FOR SOLVING PROBLEMS] A computer system includes means for storing node data on a key frame and edge data such as a transition direction between nodes and a frame rate and execution means for shifting to another node by a morphing process determined by the edge data when shifting from one node to another node. Moreover, when inputting data, node icons are connected by an edge icon so as to enable effective data input. In data registration of the morphing process, feature line data is manually inputted for one image of an image pair and then a feature point in the vicinity of the both ends of the feature line is searched so as to automatically compensate the feature line data.

9 Claims, 10 Drawing Sheets

U.S. PATENT DOCUMENTS

| | | | |
|---|---|---|---|
| 6,611,268 B1 * | 8/2003 | Szeliski et al. | 345/473 |
| 6,636,220 B1 * | 10/2003 | Szeliski et al. | 345/475 |
| 7,432,940 B2 * | 10/2008 | Brook et al. | 345/629 |
| 7,769,819 B2 * | 8/2010 | Lerman et al. | 709/217 |
| 2005/0071306 A1 * | 3/2005 | Kruszewski et al. | 706/47 |
| 2006/0009978 A1 * | 1/2006 | Ma et al. | 704/266 |
| 2006/0129933 A1 * | 6/2006 | Land et al. | 715/723 |
| 2006/0132482 A1 * | 6/2006 | Oh | 345/419 |

* cited by examiner

FIG.3

NODE DATA

ID:○○○○

| CLASSIFICATION | CONTENT |
|---|---|
| <MEMBER> | IMAGE FILE NAME CORRESPONDING TO NODE |
| | FORWARD DIRECTION MAP |
| | FORWARD/REVERSE MAP |
| | JUMP DESTINATION TABLE |
| | ⋮ |
| <METHOD> | RULE TO OBTAIN NEXT EDGE |

FIG.4

EDGE DATA

ID: × × × ×

| CLASSIFICATION | CONTENT |
|---|---|
| <MEMBER> | IMAGE NAMES FOR EACH END OF EDGE (EXPANDABLE TO 2 OR MORE) |
| | MAP DATA NAME (MAP DATA : PIXEL REFERENCE TABLE BETWEEN 2 IMAGES) |
| | DURATION |
| | SLEEP TIME |
| | LABEL NAME AND JUMP DESTINATION NAME OF EXTERNAL TRIGGER (HOTSPOT) |
| | ⋮ |
| <METHOD> | INFORMATION (RULE) TO CREATE INTERMEDIATE IMAGE(S) OF CURRENT FRAME FROM IMAGES OF BOTH ENDS OF EDGE |

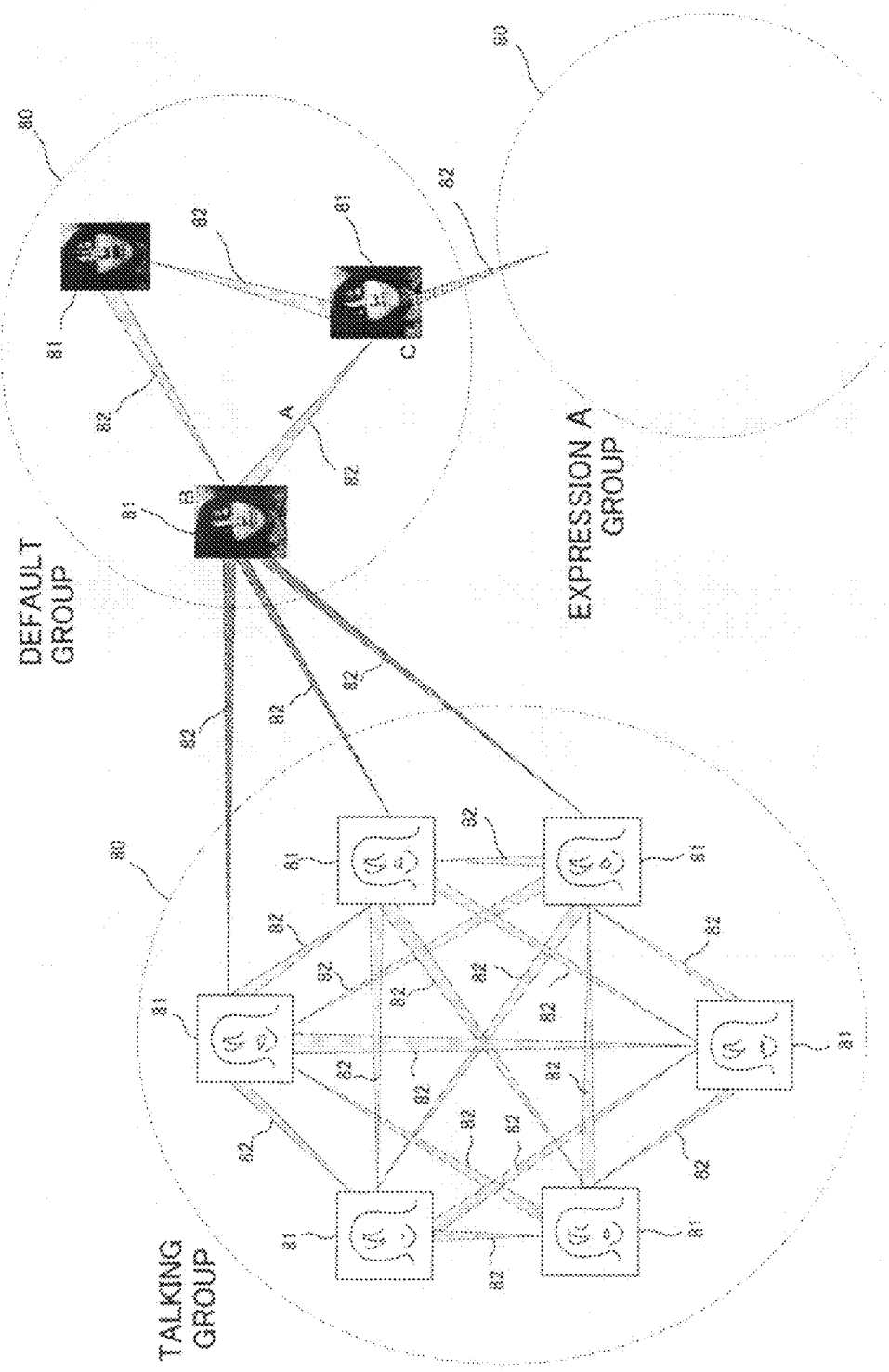

FIG.10

ID:OOOO

| CLASSIFICATION | CONTENT |
|---|---|
| <MEMBER> | FILE NAME OF IMAGE DATA CORRESPONDING TO NODE |
| | FORWARD DIRECTION MAP LIST<br>( ID LIST OF EDGE(S) TO CONNECT FORWARD) |
| | REVERSE DIRECTION MAP LIST<br>( ID LIST OF EDGE(S) TO CONNECT REVERSE) |
| | JUMP MAP LIST<br>(ID LIST OF EDGE(S) TO CONNECT FORWARD ONLY WHEN<br>EXTERNAL TRIGGER (EVENT) OCCURS) |
| | MINIMUM MAP<br>(ID OF EDGE TO CONNECT WHEN EXTERNAL TRIGGER OCCURS<br>AND IF THERE IS NO OTHER JUMP DESTINATION IN THIS NODE) |
| | ⋮ |
| <METHOD> | ALGORITHM TO OBTAIN NEXT EDGE FROM ABOVE MEMBER |

COMPUTER SYSTEM AND MOTION CONTROL METHOD

This application is a U.S. national stage entry of International Patent Application No. PCT/JP2007/066574, filed Aug. 27, 2007, which claims the benefit of foreign filing priority based on Japanese Patent Application No. 2006-229188, filed Aug. 25, 2006, the entire contents of which are incorporated herein by reference.

TECHNICAL FIELD

The present invention relates to an art in which a computer realizes natural and smooth operation. For example, it relates to a computer system and a motion control method to execute real time control of robots, or virtual person or virtual animal on a computer (hereinafter referred to as "virtual actor").

BACKGROUND ART

Traditional method of controlling a virtual actor on a computer involves calculating all frames that are to be displayed in advance and storing it inside a movie production application such as a Flash (registered trade mark) movie. With this method all of discrete frames are stored in a memory or a hard disk drive, in a similar manner as film or VTR.

However, with this method, for example, 20 to 30 frames are necessary to create 1 second of movie, and the image quality suffers during video encoding process when storing the video as a movie. As the size of image frame increases, this difference in quality becomes more noticeable. Also, when a virtual actor is able to talk, all mouth movements must be recorded in advance; therefore, when a virtual actor is to enunciate a new word, a problem arises that a new image sequence must be captured again.

On the one hand, in recent years real time morphing technology has advanced and not all frames in between key frames must be prepared in advance in order to smoothly transition from one image to another.

However, using real time morphing technology presumes that a PC is equipped with a graphic accelerator or a vast amount of memory, and hence this is not a realistic option since PCs used by most people are not equipped with graphic accelerators. Also, in order to create complex and natural appearing motion by a virtual actor with real time morphing, the only method available is to write a computer program, which is a very inefficient process method for designing motion since it requires assets such as programming proficiency or proficiency with programs such as a movie creation application; therefore, a problem arises that much of the demand cannot be fulfilled.

Also, traditionally, it was cumbersome to set hotspots, which are trigger points, to control the motion of a virtual actor. For example, in order to set a virtual actor so that rubbing his head makes him happy, the hotspot on the head must move with the head if it moves in the image. Further, there arise problems of how to make independent motions of each body part seem natural, as well as how to use less data to make complex expressions such as tilting the head while smiling, angry, etc. These issues are not restricted to virtual actors on computers, as they relate to general robotic controls.

The above noted conventional technologies are disclosed, for example, by Japanese Unexamined Patent Application Publication No. 2005-135046 and Japanese Unexamined Patent Application Publication No. 2003-204537, which are incorporated herein by reference.

DISCLOSURE OF INVENTION

Problem to be Solved by the Invention

With the above circumstances taken into consideration, the object of the present invention is to provide a computer system and a motion control method that efficiently allow data settings for natural and smooth motion of a control target such as a robot or a virtual actor through a simple, graphical, visual positioning system, and moves the control target naturally and smoothly.

Means for Solving Problems

The present invention proposes an indiscrete automaton technology, and will achieve the above object by fusing this technology with morphing technology.

The following describes the outline of a real time control of a virtual actor by an indiscrete automaton.

Indiscrete automaton: Traditionally, an automaton state transition is discrete and not continuous, such as in cellular automaton like regular expression matching or the Game of Life. This neighboring discrete state transition made continuous through morphing or interpolation is called indiscrete (continuous) automaton.

The present invention visualizes the design of the directed graph indicating the motion of an automaton, and this indiscrete automaton allows virtual actor to move naturally and smoothly. Traditionally, animation mainly placed elements such as images on a timeline, and controlled display order through scripting.

This conventional method is effective for creating a specific set of continuous motion, but it is not an effective method for creating a real time virtual actor. The present invention, however, by building a network based on key frames represented as graphical icons and allowing continuous state transitions in this indiscrete automaton network, achieves the object of real time production of a virtual actor, instead of timeline based motion.

"Automaton" is a concept that abstracts "machines" by nature; therefore, it seems as though creating "natural" motion by using an automaton may seem contradictory; however, by introducing some levels of (1) randomness, (2) delayed reactions, (3) external triggers (external input), and (4) forced routing in the state transition process, it is possible to display an automaton controlled virtual actor moving naturally.

Following are the descriptions of each concept.
(1) Randomness: By introducing randomness into the state transition process, a motion can be displayed less mechanically. If a state is connected to multiple states, a viewer's expectations can be betrayed by randomly selecting a state which creates natural motion.
(2) Delayed reactions: In order to avoid immediately tracing back a route, the immediately previous route is inactivated for a short period of time which reduces repetition of the same motion, thus reducing mechanical motion.
(3) External triggers: By introducing an external trigger (mouse, keyboard, voice volume, voice recognition result, chronological data, or camera image recognition) in a directional graph, a state transition can occur in real time, thus realizing natural motion of a virtual actor.
(4) Forced routing: Under certain conditions (combination of reaching a certain node and a trigger) routing is forced which creates an impression of intelligent motion. For example, by ensuring that mouth movements follow a routing list, smooth lip synching can be displayed.

In an automaton system that is not indiscrete, a real time reaction of a virtual actor can be created by storing all discrete frames in memory, etc. For example, both film and VTR feature discrete frames with linear connections. However, in this case, one disadvantage is that massive frames must be stored, and another problem is that it cannot create new motion for new lip synching data. On the other hand, with an indiscrete automaton, only key frame data are stored; therefore, new motion can be created through arbitrary frame rates and ordering.

Next, morphing technology is described.

Image warping is the process of digitally manipulating an image such that the shape portrayed in the image becomes distorted. If there are 2 images, and if a pixel in the first image corresponds to a pixel in another location in the second image, then warping the image by moving such pixels while cross-resolving the first image with the second image is called morphing.

Traditionally, morphing technology had not been performed in real time. In other words, each frame of the morphing process was calculated and output first, and then the result was written to film or VTR as a movie which was then recognized as a moving image. In recent years, enhancements in the processing power of workstations and PC graphic accelerators have made real time morphing possible.

Real time morphing prepares 2 meshes where images are mapped onto each mesh, and morphing is achieved by warping the meshes while changing their transparency and cross-resolving their texture maps. However, a recent movie production application (Flash 8®) uses a method called Displacement Filter to make real time morphing possible without relying on mesh warping.

In a Displacement Filter, an image data's RGBA channels for the filter are designated as (x) channel and (y) channel where they have a displacement range of +/−128 dots (since color information has 256 values, half that value can have plus/minus assigned). Using this image data for pixel displacement allows pixel displacement without relying on mesh warping. Using this method, motion data will exist for all pixels in an image.

Morphing by mesh warping performs warping according to the displacement of the location of each point on the mesh, and the accuracy of the morphing and the size of mapping data depend on the granularity of the mesh. In the equivalent mesh that does not depend on the contents of an image, if the mesh granularity is not fine, the quality of an image suffers. A problem arises that if the mesh granularity is fine, then the corresponding data size will become large. In order to ensure small data size while maintaining high quality warping, the mesh granularity must take image content into consideration and mesh data must be compressed.

Feature based morphing does not use mesh warping, instead feature lines are placed in an image, and all pixel displacements affected by the feature lines are calculated on a pixel basis to produce an output image data. Traditionally feature based morphing was not used in real time morphing since it requires pixel displacement to be calculated without using a graphics accelerator. However, with the above movie production application's Displacement Filter, real time morphing has become a possibility. This method cannot use a graphics accelerator; therefore, morphing a large image, such as a full-screen image, may be slow depending on machine specifications, but it is fully realizable for image sizes that are commonly displayed in Web browsers.

Morphing using mesh warping with a graphics accelerator cannot be distributed as a general online service since many machines today still lack graphics accelerators.

On the one hand, feature based morphing using the Displacement Filter can be said to be the most practical real time morphing method since the above mentioned movie production application has over 90% market share. Since feature based morphing has motion data for each pixel, its mapping data is larger than that of the mesh warping method, but its final output data in the form of feature lines data is smaller in size than mesh warping method data; therefore, it is advantageous when authoring or sending mapping data over a network.

Also, by sending control lines data during data transmission, each pixel's displacement data can be recreated locally, thus mapping data sent is smaller than for existing mesh data, thus effective compression can be expected.

To create an image based virtual actor, consecutive images must be morphed, but manually morphing consecutive images is very difficult. For example, warping a human face into a tiger face is easy when done manually; however, if the same face changes slightly, the image can become blurred or lose image quality. Therefore, it is not realistic to perform consecutive morphing without utilizing automatic morphing. Automatic morphing depends on the algorithm used, but all available algorithms are heuristic; therefore, it is impossible to avoid correspondence errors and compensating for them becomes unavoidable. With existing methods, resulting images from automatic morphing have to be compared to each frame pair and compensated. This means that compensating results for each frame pair does not affect other frame pairs (does not become inherited). By following the steps of the present invention, these correspondence errors and compensations can be minimized.

In order to achieve the object, there is provided according to an aspect of the present invention, a computer system for moving a control target with node data relating to basic status, which means nodes, of the control target and edge data for specifying motion of the control target when status of the control target transitions from one node to another node, wherein the edge data includes the direction of transition between nodes, and transition duration or frame rate, the computer system comprising an execution means for transitioning through intermediate state(s) as dictated by the edge data when transitioning from one node to another node according to the edge data.

The edge data above include corresponding relationships between external input and jump destination node, and the execution means executes state transition if there is external input that corresponds to the node of the jump destination when transitioning states based on edge data. Here, control target means objects that can be controlled by computer and this includes virtual actors on general purpose computers as well as robots controlled by specialized computers.

When transitioning from one node to another node through several other states, the present invention does not create multiple state data, but instead uses the edge data to determine only the basic node data and the transitions between nodes (i.e. motion of the control target). And the execution means uses this edge data to create the intermediate states between nodes while transitioning to other nodes.

Preferably, the computer system further comprises means for setting a trigger flag if there is an external input, wherein the execution means determines whether the trigger flag has been set or not, and if the trigger flag has been set use shorter transition durations or reduce the frame rate compared to when the trigger flag is not set.

Also, the node data corresponds to a connecting high speed edge data for situations where there is an external input but no jump destination in the node. In the above execution means, if there is an external input, edge data that is associated with the node is given preference, and it is preferable that the high speed edge data is used for state transition instead of another edge data.

Therefore, if there is an indirect path to the target facial expression node, then follow that indirect route.

When transitioning from one facial expression to another expression, if a directly connected edge between the nodes is used, the amount of edge data which contain information between nodes increases, which increases data volume, and there is a risk of visually complicating edge data and making it difficult to see the connections. However, if a high speed route is set as in above, and in normal situations other routes are used with predetermined transition duration and morphing process, and if there is an external input to reach a target node, then shut down all routes except the high speed route and/or speed up the transition duration to transition naturally to the target node without increasing the number of direct connections between nodes.

If a computer system related to the present invention is applied to a human image displayed on a computer monitor, prepare a storage means for basic frames of the human image that correspond to nodes, where node data includes information such as the coordinates of feature lines at feature points, rotational information, and transformation information, and in the execution means morphing process is conducted to create intermediate states between nodes by utilizing the basic frames' feature lines that correspond with each node.

At this time, basic frames include enunciation frames, and edge data include vocal data and transition duration information, and the execution means displays an image corresponding to a basic frame while outputting vocal data that correspond to the edge data while utilizing morphing process on the image for the transition duration to change the image. With this, images and voices can be naturally synchronized.

Also, the computer system according to the present invention further comprises a basic data input means for performing a process to create node icons using images that are input as basic frames while displaying the node icons on a computer monitor, and a process to register connection information between node data corresponding to node icons and edge data corresponding to edge icons by the node icons being connected with the edge icons that indicates connections between node icons and contains directional information.

For example, if an edge icon is expressed as an arrow and the arrow points from icon of node 1 to icon of node 2, then the corresponding connection information records node 1 as its source and node 2 as its destination.

This invention reduces input mistakes while enhancing the efficiency of node data and edge data input by creating node icons based on images which are key frames, and connects node icons in order by following the directional edge icons.

Also, there is provided according to an aspect of the present invention, the computer system wherein the connection information includes transition information on images related to nodes, further comprising an editing means for performing a process to input feature line data for a single image from a pair of images selected, a process to search for feature points in the vicinity of both ends of the feature line and automatically compensate the inputted feature line data with the feature points, a process to continuously compute feature line data for other image pairs by utilizing the automatically compensated feature line data, and a process to compute the transition information by pixel displacement between images according to the motion of the feature line data.

This invention manually draws feature lines on a virtual actor's feature points such as mouth, eyes, etc. using the first image pair. Afterwards, this automatically compensated feature line data is utilized and applied to the next image pair and so on. This combination of manual setting for image pairs and the automatic compensation afterwards makes efficient matching process possible.

Also, by utilizing feature based morphing, data necessary for feature line morphing is stored, and when compared to mesh morphing which is mostly conducted manually there are less points to input, and feature line data is much smaller than mesh vertices data; therefore, it is superior in terms of data transmission and processing as well.

Also, the computer system according to the present invention comprises a server apparatus and a terminal apparatus connected via a communications network where the server apparatus sends a program of the execution means to the terminal apparatus through the network, and the program of the execution means executed on the terminal apparatus reads in node data and displays image data associated with the node and executes state transition according to the edge data.

This invention, by placing the execution means in the terminal side, and by accepting external triggers including voice and image data as input from terminal apparatus, only the necessary data are requested and received from the server apparatus. With this configuration, network traffic is reduced and each terminal apparatus can activate their virtual actor.

There is provided according to an aspect of the present invention, a motion control method for controlling motion using a computer, the method comprises a process for storing basic status data of control target as node data, a process for storing, as edge data, data specifying motion when transitioning from one node to another node including direction between nodes, and frame rate or transition duration, and a process for transitioning from one node to another node along with the frame rate or transition duration through intermediate state(s) created using the node data and the edge data.

Also, in the motion control method according to the present invention, the execution process, if the destination end of the edge data is connected to a set of multiple nodes then selects one random node from the set except for the immediately previous node, and then transitions the state to the selected node.

As stated above, according to the present invention, data configuration can be performed efficiently since control targets such as robots and virtual actors will be able to move naturally and smoothly with small volume of data. Data configuration is especially unique due to its graphically connected edges and nodes which allow motion to be defined by inexperienced programmers and application developers where they can create data which in turn allows the invention to respond to demands of mass production.

BRIEF DESCRIPTION OF THE DRAWINGS

FIG. 3 is the data architecture of node data 53 shown in FIG. 1.

FIG. 4 is the data architecture of edge data 54 shown in FIG. 1.

FIG. 5 is a display example describing basic data input means 31 shown in FIG. 1.

FIG. 10 is a data architecture diagram of node data 53 in another embodiment of the present invention.

DESCRIPTION OF PREFERRED EMBODIMENTS

Figure 1:
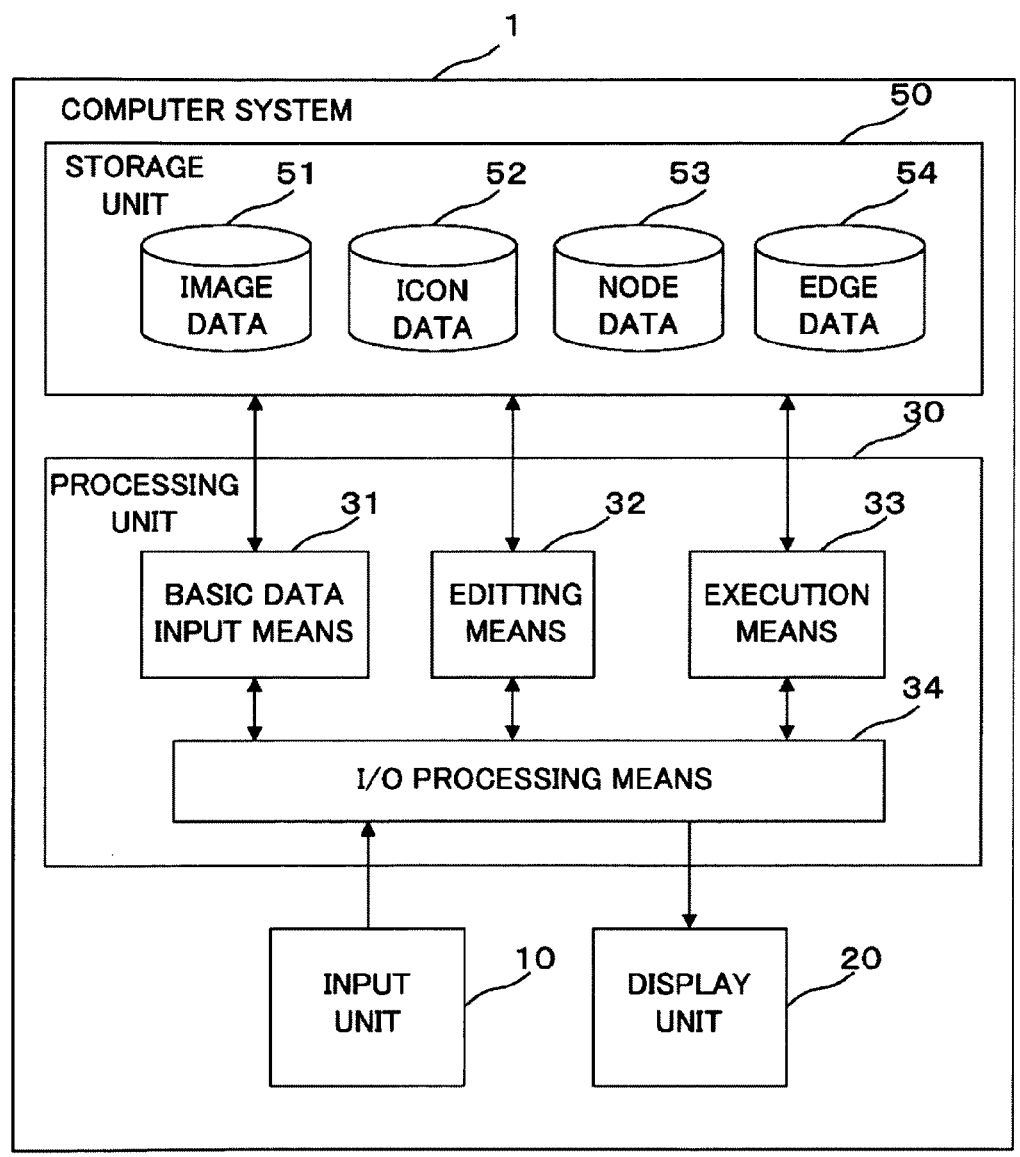
FIG. 1 is a functional block diagram of the computer system in the first embodiment of the present invention.

Preferred embodiments in accordance with this invention are described below. FIG. 1 is a functional block diagram of a computer system of this embodiment.

Computer system 1 here includes data input unit 10 such as keyboard and mouse, processing unit 30 to compute according to input data, display unit 20 to display processed data, and storage unit 50 to store data.

Also, processing unit 30 includes basic data input means 31 to input basic data such as image data, node data, and edge data, editing means 32 to configure the motion data between images, and execution means 33 to make virtual actors move according to input data.

Figure 2:
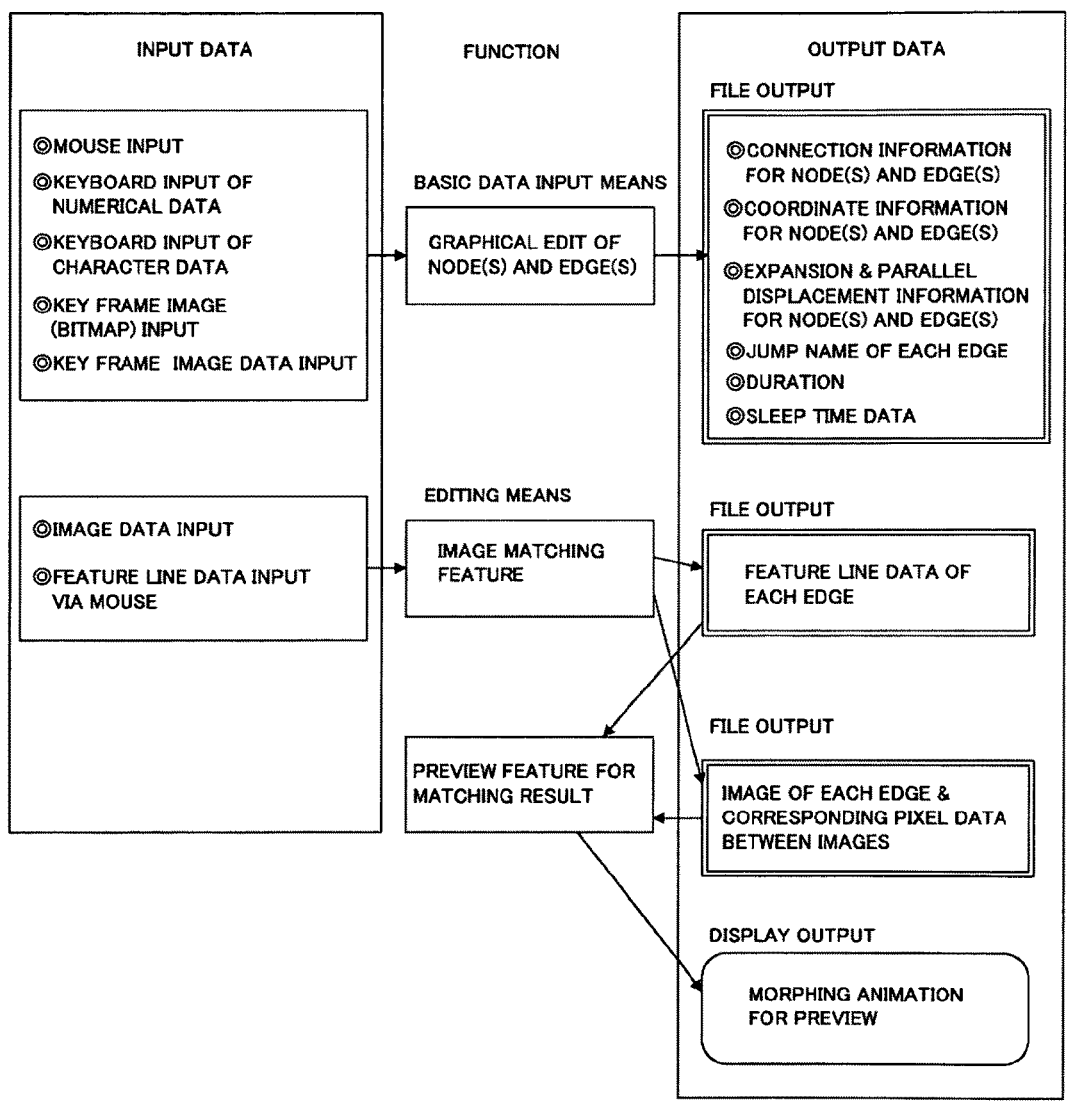
FIG. 2 is an entity-relationship model diagram showing the basic data input means 31 and editing means 32 of FIG. 1 and input and output data.

FIG. 2 describes the relations between the functions of basic data input means 31, editing means 32, and input and output data. Basic data input means 31 inputs numbers, characters, and key frame images from input unit 10, graphically edits using these data, then stores information such as node and edge connection information in storage unit 50.

Also editing means 32 inputs image data and feature lines via mouse input, executes matching process between images, and then stores in storage unit 50 the results as feature line data for each edge while also storing into storage unit 50 images created with this data and corresponding pixel data between images. Further, as a preview feature for the matching results, morphing animation process is executed using these created data.

Next, actions of each means in processing unit 30 are described.

[Basic Data Input Process]

Basic data input means 31 allows intuitive designing of an automaton by laying out node icons and edge icons visually.

(A) Node Icons Distribution Process

Basic data input means 31 reads in multiple bitmap image data 51 in a specific folder, creates icons of the images and stores them in icon data 52 while also displaying the output to display unit 20.

For example, the basic data input means 31 creates icons in a 3-dimensional computer graphics (3D CG) space by reducing the size of a square bitmap image then texture mapping it to display. These icons represent each node (also known as cell, key frame, or basic frame).

In order to improve visual recognitions and usability of icons, it is preferable that features such as node icon scaling feature (enlarging and shrinking icons), node icon movement feature (moves icon to a specific coordinate), node icon alignment feature (aligns icons for easier viewing), and a deletion feature that can selectively delete node icons and their corresponding node objects are implemented.

Node data 53 corresponds to node icons and it stores data members and methods with rules and procedures. FIG. 3 describes an example of node data. Members include image file name that corresponds to the node, forward direction map (edge when connected in the forward direction), forward/reverse map (edges for forward and reverse connections), jump destination table (the next edge as determined by a trigger), and methods include rules to determine an edge to be selected.

(B) Edge Icon Distribution Process

Operator creates an edge icon of an arrow shape (edge object creation feature) that joins one node icon to another node icon according to input command. Further, the operator causes to display a single route after tracing multiple icons and edges recursively to obtain all routes. Operator selects an edge that is in the displayed route, and type characters into the edge label, and sets the numerical value for the duration (the number of steps it takes to change) of the selected edge. Also, the operator sets the numerical value for the selected edge's sleep time duration.

If necessary; possible additional features can be to delete edge icons and corresponding edge data, or to transform and re-display an arrow showing the edge by movement of an icon.

FIG. 4 below describes an edge data as input using the above process.

Edge data members include image names for each end of the edge (can be expanded to 2 or more), map data name, duration, sleep duration, and external trigger (hotspot) label name, and methods include intermediate frame creation rule (for example, a morphing procedure) that uses images at each end of the edge. Here, map data means the pixel reference table between 2 images.

FIG. 5 is an example of node icons and edge icons that are output to display unit 20. Here, operator distributes node icons 81 on screen, then connects node icons 81 with edge icons 82. Edge icons have a direction which can be visually confirmed, and this sets whether a node icon 81 is connected in the forward or reverse direction.

For example, in FIG. 5 there are icons labeled A, B, and C where the source end of edge icon A is connected to node icon B, and the destination end is connected to node icon C; therefore, edge data that corresponds to edge icon A includes identification information (ID) on node icon B to identify the source end and node icon C to identify the destination end. These icons identification information allow for the extraction of related node data and basic frame images.

Also, combinations of node icons and edge icons are created according to units of facial expressions or motions (including talking). The example of FIG. 5 consists of the initially executed Default Group, Talking Group to create enunciating expressions, and Expression A Group to execute another expression (for example a smile). In FIG. 5, examples of shrunken image data icons are shown as the Default Group node icons. Talking Group's node icons are simplified here, and in the next paragraph (C) is described the process which consists of registering key frames that match the shape of the mouth during enunciation of certain sounds, then transition states according to corresponding edge data and talking data. Expression A Group node icons and edge icons are omitted in this drawing; however, node icons that are key frames should be distributed and edge icons connect each node. At this time, basic data input means 31 stores connection information for each node data and edge data.

(C) Talking List Node Registration Process

Node registration means the registration of an image associated with a node, a node icon created from this image, and information which associates the image and the icon, and the registration of node data related to the edge data.

Talking list stores key frames as nodes for enunciating vowels and consonants where the mouth is closed, namely the 'M', 'V', 'L', and 'th' shapes of the mouth, and by connecting the talking nodes together, can determine a route within the talking nodes according to the voice data and its duration.

Specifically, set node numbers for enunciations such as 'a', 'i', 'u', 'e', 'o', 'm', 'v', 'l', and 'th' as n1~n9 (integers), in the case of 'aiueo' sounds, giving a list format of [n1, dur1, n2, dur2, n3, dur3, n4, dur4, n5, dur5] (where dur1~dur5 are durations) can display mouth motions for lip synching.

(D) Saving and Loading a Project

Basic data input means 31 has a feature that can save node icons, distribution of edge icons represented by arrows (coordinate data), and their connected states as a project file, and can load a project file of distribution and connection of the node icons and the edge icons.

[Editing Process]

Next, the editing process procedure in editing means 32 is described. Operator will map between images input using editing means 32 by utilizing feature lines (also known as control lines).

Figure 6:
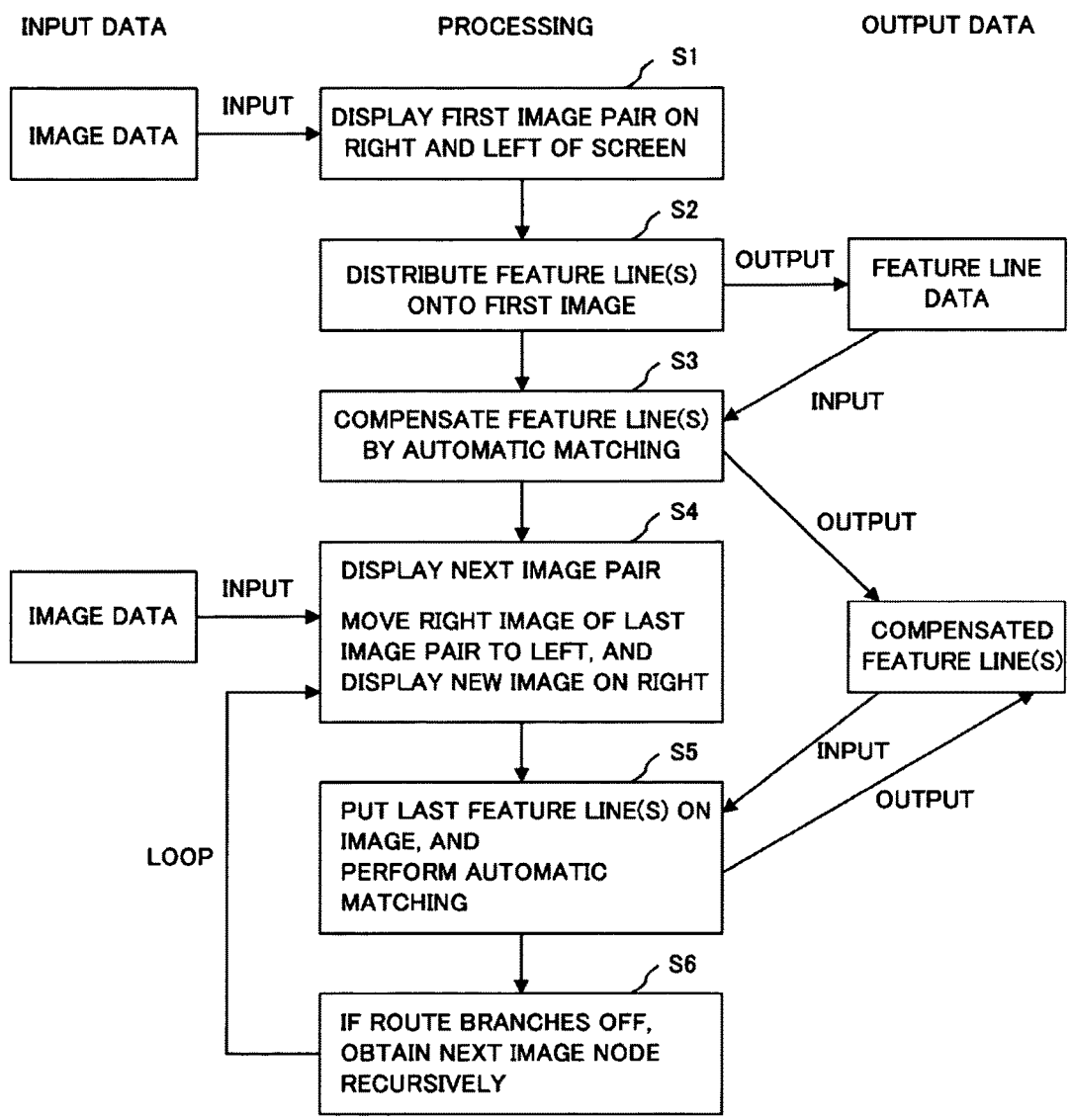
FIG. 6 is a flow chart of the editing process in an embodiment of the present invention.

FIG. 6 is used to describe the editing process procedure below.

Firstly, operator selects the first image pair (S1). Then, operator enters feature lines manually into the first image (S2). Specifically, the operator selects two feature points each from the mouth, eyes, nose, eyebrows, face contours, and head contours and draws lines between them. Editing means 32 computes "good feature points" that are located close to either end of feature lines, then automatically compensates them. The editing means 32 utilizes' these automatically compensated feature lines to automatically compute the feature lines of the second image using optical flow (S3).

Then, the process displays the next image pair (S4), and uses the feature lines obtained in step S3 as the initial feature lines for this image pair and uses optical flow to automatically compute the feature lines of the image (S5). Then the process determines pixel displacement from the feature lines, and then stores that data in a file as that edge's mapping data. At this time, the process determines all pixel displacement information using feature based morphing.

Steps S4 and S5, the process performs automatic matching for all consecutive recursive routes and distributes feature lines for all edges (S6).

Conventional procedure requires manual compensations after automatically matching all image pairs, since compensations using human eyes do not get inherited to other image pairs, all image pairs must be compensated manually in a similar manner. However, according to this algorithm of the invention, by entering the feature lines in the first image pair and by using good feature points to automatically compensate the ends of feature lines, then using optical flow to obtain the feature lines in the next image, high quality matching is made possible with the consecutive automatic matching of image pairs after the initial image pair.

With this method, the number of data points to be matched has been drastically reduced compared to existing methods; therefore, required computation time has also been reduced, and since this is a compromise of feature lines as viewed by human eyes and by a program, this ensures that image warping will be based on good feature lines, thus realizing relatively natural image warping.

[Execution Process]

Next, execution means 33 that moves a virtual actor with data input using the above process will be described using FIG. 7.

First, the process extracts the first edge from the start node (S101). Then, the process determines whether it is within the frame or not (S102), and if it is outside of the frame then, as a process to obtain new node, determines forward or reverse direction from the edge data (S103). And then, if the frame order is forward ("YES" in 5103) the process extracts the source node of the edge (S104). On the other hand, if the frame direction is reverse ("NO" in S103), then the process extracts the destination node of the edge (S105).

Next, process determines whether this is a talking motion or not by using the "talk" flag in the node data (S106), if it is "YES" meaning the "talk" flag is "ON", then the process extracts image data from the talk list and obtains the next edge and duration (S108). And then, the process follows the motion information created in editing means 32 to warp the image of the current edge, and proceed 1 frame (S109).

On the other hand, if step S106 is "NO", meaning this is not a talking motion, then the process obtains the next edge from that node's method of new edge selection process routine (S110).

Figure 8:
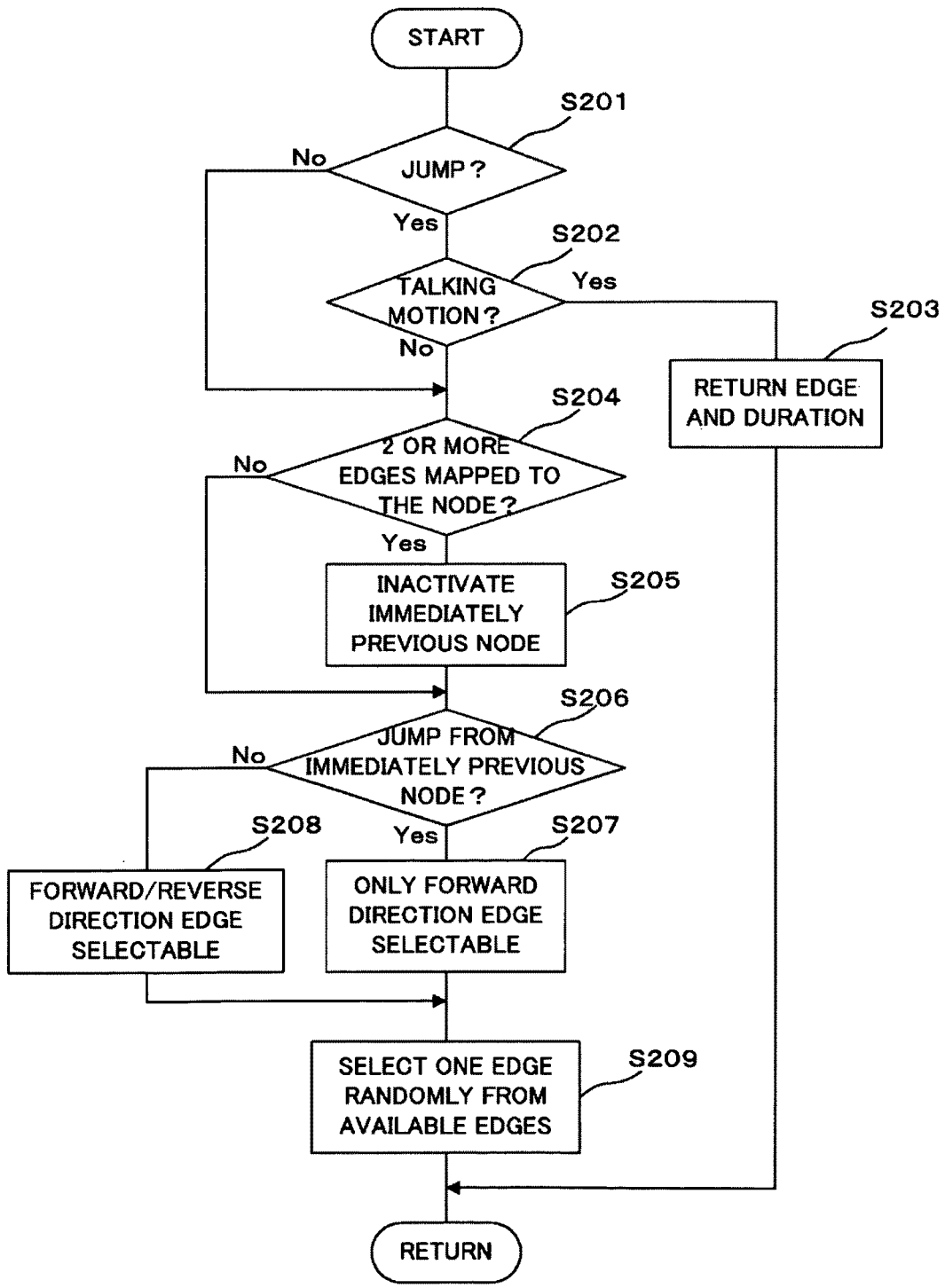
FIG. 8 is a flow chart of the new edge extraction process procedure shown in FIG. 7.

FIG. 8 is used to describe this new edge selection process routine. First, the process determines if the node is a jump or not (S201), if "YES" then the process determines the jump type and returns an edge that matches the jump type. If it is talking motion, then the process sets the "talk" flag to "ON" (S202, S203).

If step 5201 is "NO", then the process determines if there are two or more edges mapped to that node (S204), and if there are two or more, then activates the immediately previous edge with a timer (S205). Also, the process determines if the immediately previous node was a jump or not (S206), and if it was a jump then only a forward direction edge may be selected (S207). If it was not a jump, then either a forward edge or a reverse edge may be selected (S208). And then, the process selects an edge randomly from the available edges (S209).

Thus, a new edge can be obtained from the current node. The series of processes of execution means 33 described above moves a virtual actor.

According to this embodiment, it is possible to enter node data and edge data efficiently in the basic data input process without highly specialized knowledge.

Also, in the editing process, feature points near both ends of manually set feature lines are extracted, and by combining these feature points with the feature lines in conducting automatic compensation allows feature lines from the first image pair to be matched in subsequent image pairs without performing almost any manual compensations, which improves work efficiency. Also, mismatched results can be deleted.

Further, in the execution process, edge data allows the execution of morphing process of image pairs, while a node's edge selection process (method) realizes smooth motion that is linked to a hotspot. Now, if image is morphed consecutively, consecutive frames will be created and inserted in between existing frames, which allows effects such as slow motion to be created. This allows virtual reality to be created based on images, which means there are image based virtual reality applications, and the stored still image data volume can be reduced.

For the talking process, limited image data is sufficient to realize variety of natural talking motions.

(High Speed Route Processing)

Next, as an applied example, high speed route processing for efficient state transitions is described.

FIG. 10 is a node data structure of another embodiment. The main difference from FIG. 3 is that there is provided the minimum map data that includes edge ID (high speed edge data identification information) to connect in preparation for a case where a node has no jump destination when an external trigger occurs.

Figure 11:
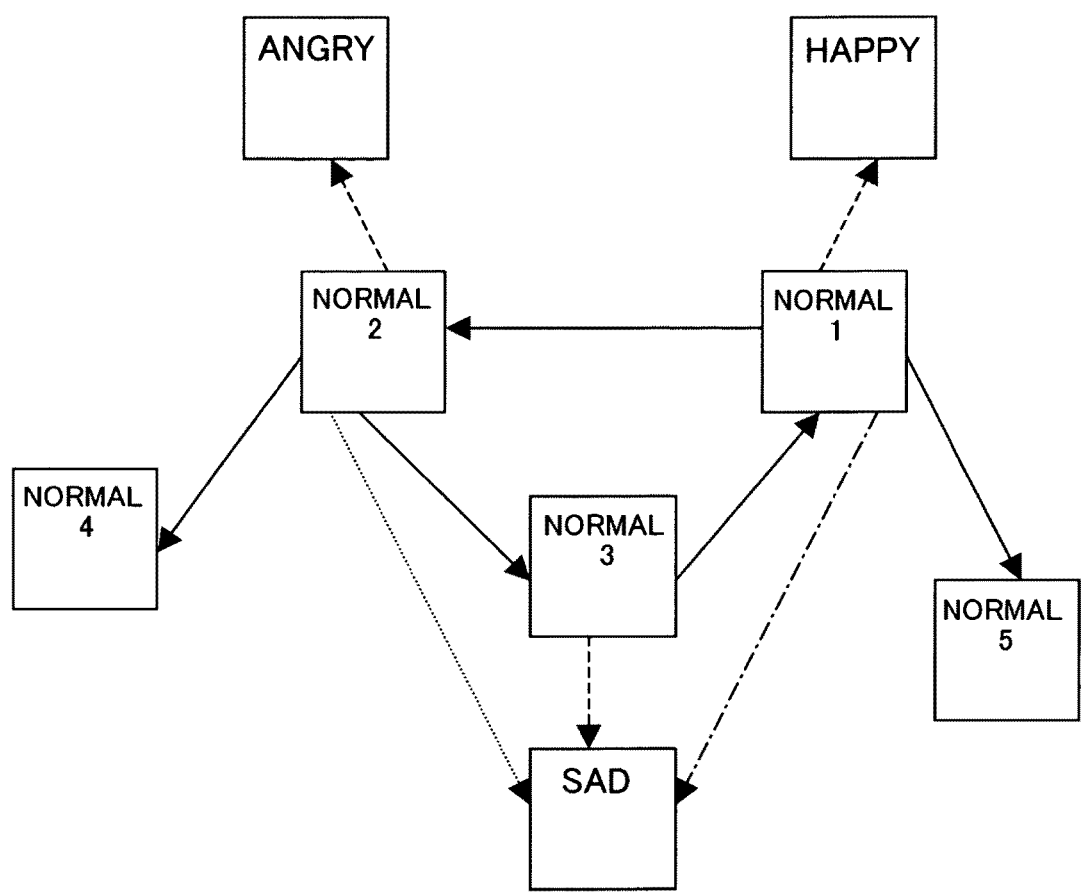
FIG. 11 is a state transition diagram used to describe high speed route processing in another embodiment of the present invention.

Procedure for state transition will be described below using FIG. 11. In this drawing solid line edges are high speed routes, and nodes labeled "Normal 1"~"Normal 4" are the changes in expression in the normal state.

If there is no external trigger (mouse or keyboard), then transitioning occurs between these normal nodes; however, if there is an external trigger, then a dotted edge is followed to transition to one of the emotive expression states (happy, angry, sad, joy).

If current state is Normal 1, and if there is an external trigger commanding the state to be "sad", and if there is no high speed route then the transition must be detoured through Normal 2 and Normal 3 or Normal 4 which delays the reaction. A dotted line edge from Normal 1 to "sad" can be set, but increasing the number of nodes complicates the situation and increases the data volume.

For this reason, for high speed route processing, if there is an external trigger, execution means 33 stores the trigger flag in storage unit 50, while reducing the solid line route edge data transition duration value (duration in FIG. 4), and if the trigger flag has been set then executes transition using the node data minimal map and inactivates other routes (such as route Normal 2=>Normal 4). The process repeats this process until the external trigger's object node of "sad" is reached, which reduces the time required to reach the object reaction. Now, the trigger flag is reset when the object node has been reached.

High speed route processing inactivates all routes except the high speed route, thus increasing motion speed while not increasing the number of connections between nodes and achieving natural and smooth state transition to the object node.

Also, the process can be executed faster and algorithm can be simplified by labeling each node and edge's connection information as "forward", "reverse", "jump" (edge with label when there is an external trigger), and "priority (minimum)" (prioritized edge when external trigger occurs).

Next, a second embodiment of the present invention is described.

The first embodiment is in a standalone computer architecture; however, this embodiment is in a client-server architecture, where image data, node data, edge data are sent from a server to a terminal apparatus over a network such as the Internet, and a virtual actor moves on the terminal apparatus.

Figure 9:
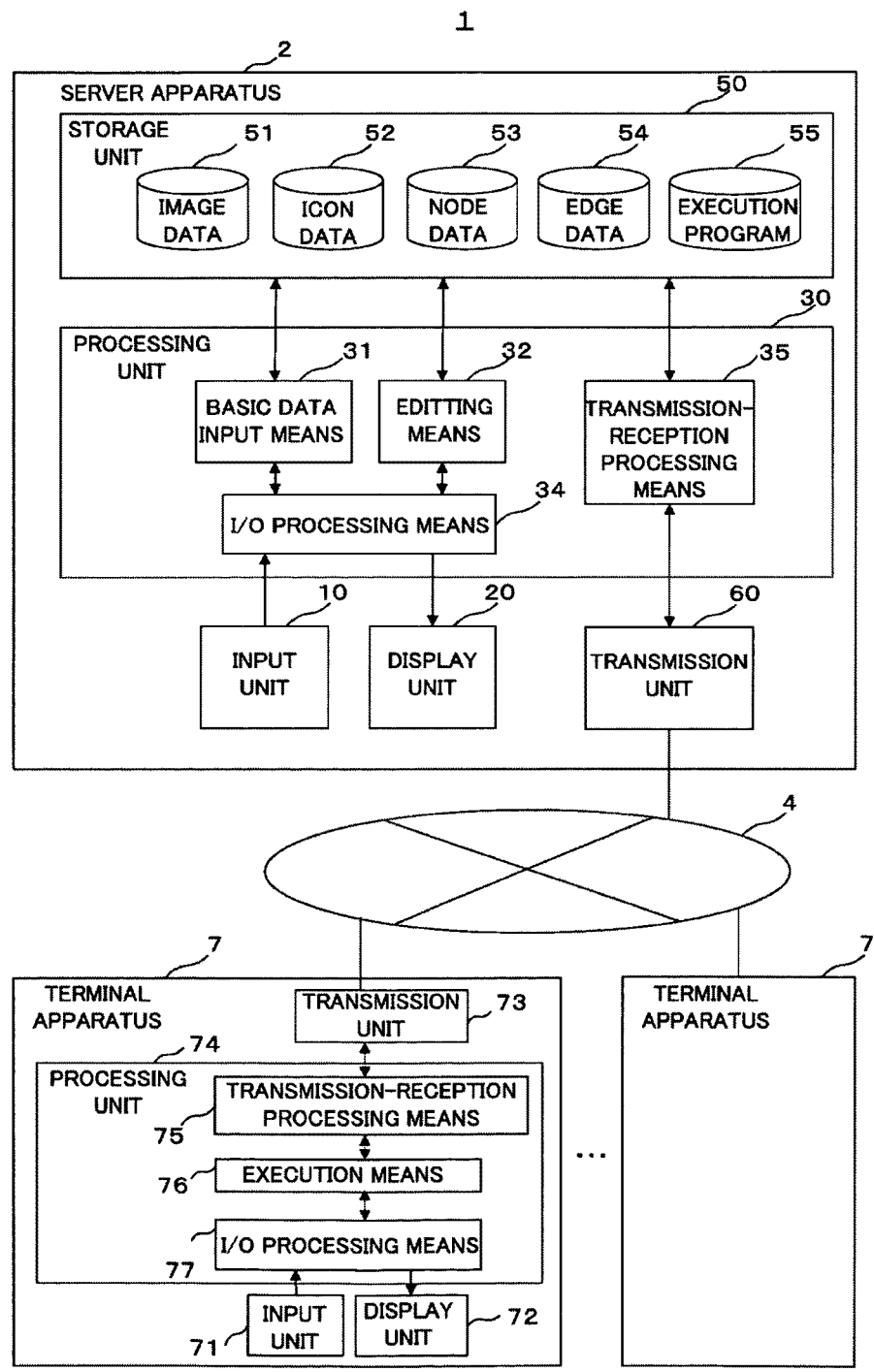
FIG. 9 is a functional block diagram of a computer system in the second embodiment of the present invention.

FIG. 9 is used to describe mainly the difference from the first embodiment. In this embodiment, program 55 which functions as an execution means (hereinafter referred to as "execution program") is stored in storage unit 50 of server apparatus 2, and if there is access from terminal apparatus 7, this execution program 55 is sent to the terminal apparatus through transmission-reception processing means 35. In terminal apparatus 7, the execution program received is booted, and necessary data is constantly read in from server apparatus 2 to display virtual actor in display unit 72.

Below is the description of computer system 1 in this embodiment.

After the basic data registration process, the description of the editing process is omitted here since it is the same as in the first embodiment.

[Execution Process]

User specifies a URL from terminal apparatus 7, and accesses server apparatus 2, then server apparatus 2 sends execution program 55 stored in storage unit 50 to the terminal apparatus.

Execution program 55 is loaded onto processing unit 74 of terminal apparatus 7, and then booted up as execution means 76 and then reads in the start node image and node data from server apparatus 2. And then while displaying the image it just read in, a node data method selects an edge data and reads it in from server apparatus 2.

Figure 7:
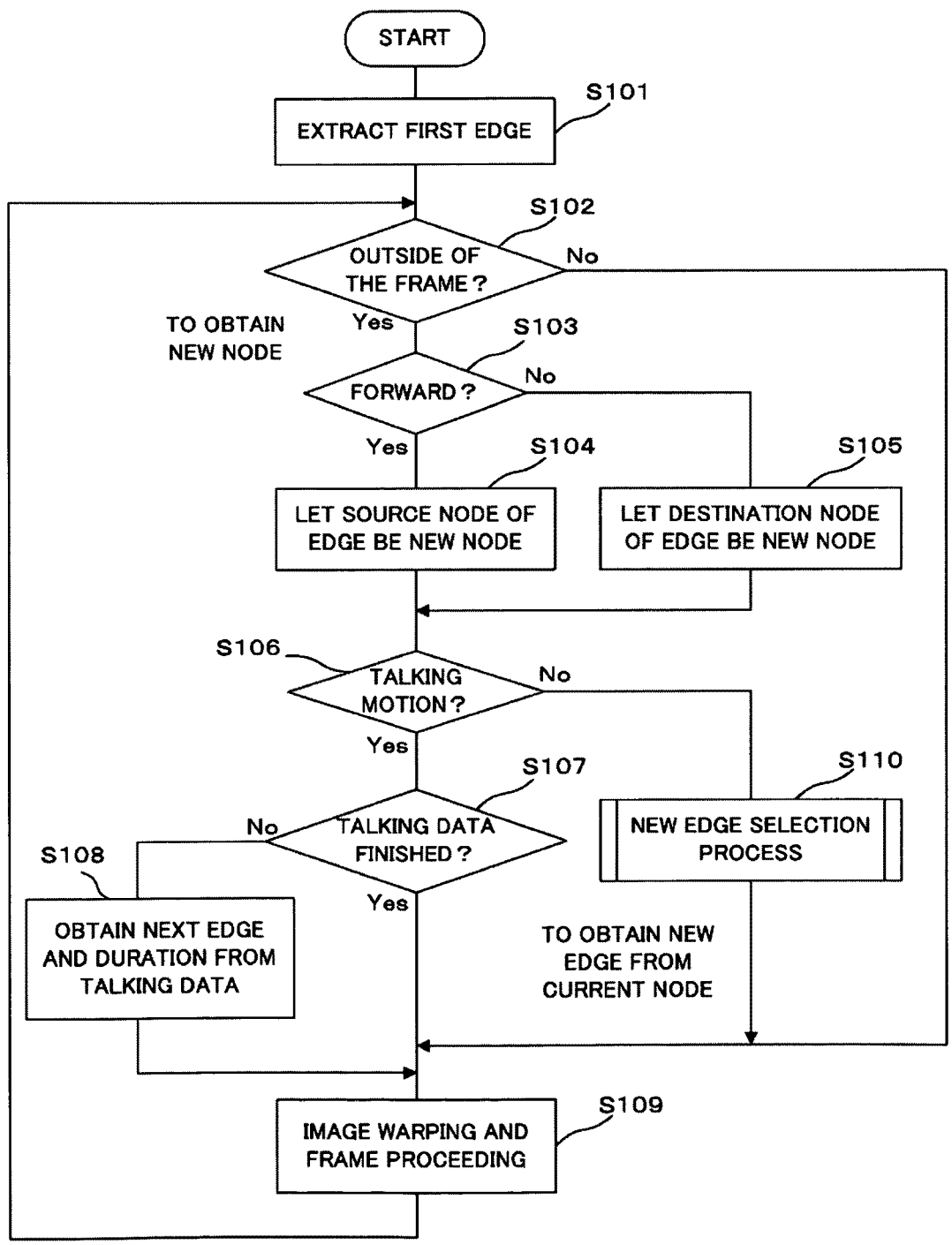
FIG. 7 is a flow chart of processing procedure of execution means 35 shown in FIG. 1.

Also, based on the edge data, the method reads in node image data from the other end of the edge and executes the process in FIG. 7.

Then, the method moves a virtual actor on the terminal apparatus with the talking process, image warping via morphing, jump process from the current node, etc.

According to this embodiment, the communication network traffic is reduced since data that is sent from a server apparatus to a terminal apparatus consist only of image data that are key frames, node data, and edge data after sending the initial execution program, this is drastically less in volume than sending image data for each frame as in existing technology.

Network traffic can be further reduced by storing image ID, node ID, and edge ID on a terminal apparatus and only accessing a server apparatus when data that is not stored on the terminal apparatus becomes necessary.

The present invention can be applied not only in the contents industry to move a virtual actor on a computer, but it can also be applied on computer controlled robots, etc.

The invention claimed is:

1. A computer system for moving a control target with node data relating to basic status, which means nodes, of the control target and edge data for specifying motion of the control target when status of the control target transitions from one node to another node, comprising:
    a storage unit for storing data; and
    a processing unit
    wherein the edge data includes the direction of transition between nodes, and transition duration or frame rate, and
    wherein the processing unit comprises:
        an execution means for transitioning through intermediate state(s) as dictated by the edge data when transitioning from one node to another node according to the edge data;
        a basic data input means for performing a process to create node icons using images that are input as basic frames while displaying the node icons on a computer monitor, and a process to register connection information between node data corresponding to node icons and edge data corresponding to edge icons by the node icons being connected with the edge icons that indicates connections between node icons and contains directional information; and
        an editing means for performing a process to input feature line data for a single image from a pair of images selected, a process to search for feature points in the vicinity of both ends of the feature line and automatically compensate said inputted feature line data with the feature points, a process to continuously compute feature line data for other image pairs by utilizing the automatically compensated feature line data, and a process to compute the transition information by pixel displacement between images according to the motion of the feature line data.

2. The computer system according to claim 1, wherein the execution means create an intermediate frame between the images by morphing based on the transition information of images related to each node.

3. The computer system according to claim 1, wherein the edge data include relationships between external input and jump destination node, and said execution means executes state transition corresponding to the jump destination node related to the external input if there is an external input when transitioning nodes based on edge data.

4. The computer system according to claim 3,
wherein said processing unit further comprises means for setting a trigger flag, if there is an external input, and;
wherein said execution means determines whether the trigger flag has been set or not, and if the trigger flag has been set use shorter transition durations or reduce the frame rate than if the trigger flag is not set.

5. The computer system according to claim 3,
wherein the node data is related to high speed edge data for situations where there is an external input but no jump destination in the node, and said execution means, if there is an external input, executes state transition based on the high speed edge data by a priority higher than other edge data related with the node.

6. The computer system according to claim 1,
wherein the basic frame includes an enunciation frame, and edge data includes vocal data and transition duration information, and the execution means displays an image corresponding to the enunciation frame while outputting vocal data that correspond to the edge data and changes the image by performing morphing process on the image for the transition duration.

7. The computer system according to claim 1,
wherein the computer system comprises a server apparatus and a terminal apparatus connected via a communications network where the server apparatus sends a program of the execution means to the terminal apparatus through the network, and the program of the execution means executed on the terminal apparatus reads in node data and displays image data associated with the node and executes state transition according to the edge data.

8. A motion control method for controlling motion using a computer having a processing unit and a storage unit, the method comprising the steps of:

storing, by using the processor unit, basic status data of control target in the storage unit as node data;
storing data specifying motion when transitioning from one node to another node including direction between nodes, and frame rate or transition duration in the storage unit as edge data;
creating node icons using images that are input as basic frames from the input unit while displaying the node icons on a computer monitor;
registering connection information between node data corresponding to node icons and edge data corresponding to edge icons by the node icons being connected with the edge icons that indicates connections between node icons and contains directional information to the storage unit;
inputting feature line data for a single image from a pair of images selected;
searching for feature points in the vicinity of both ends of the feature line and automatically compensating said inputted feature line data with the feature points;
continuously computing feature line data for other image pairs by utilizing the automatically compensated feature line data;
computing the transition information by pixel displacement between images according to the motion of the feature line data; and
transitioning from one node to another node along with the frame rate or transition duration through intermediate state(s) created using the node data and the edge data.

9. The motion control method according to claim 8,
wherein the execution process, if the destination end of the edge data is connected to a set of multiple nodes, the processing unit performs a process of selecting one random node from the set except for the immediately previous node, and transitioning the state to the selected node.

\* \* \* \* \*